(12) United States Patent
Roth et al.

(10) Patent No.: US 11,992,791 B2
(45) Date of Patent: May 28, 2024

(54) COMBINATION FLUID AND GAS FILTER

(71) Applicant: KX Technologies, LLC, West Haven, CT (US)

(72) Inventors: Robert Roth, Concord, NC (US); Blake Savoy, Killingworth, CT (US); Jerome Barrillon, West Hartford, CT (US)

(73) Assignee: KX TECHNOLOGIES LLC, West Haven, CT (US)

( * ) Notice: Subject to any disclaimer, the term of this patent is extended or adjusted under 35 U.S.C. 154(b) by 1064 days.

(21) Appl. No.: 15/921,164

(22) Filed: Mar. 14, 2018

(65) Prior Publication Data

US 2018/0264384 A1    Sep. 20, 2018

Related U.S. Application Data

(60) Provisional application No. 62/472,888, filed on Mar. 17, 2017.

(51) Int. Cl.
*B01D 36/00* (2006.01)
*B01D 29/13* (2006.01)
(Continued)

(52) U.S. Cl.
CPC ........... *B01D 36/001* (2013.01); *B01D 29/13* (2013.01); *B01D 39/08* (2013.01); *B01D 39/14* (2013.01);
(Continued)

(58) Field of Classification Search
CPC ...... B01D 29/13; B01D 36/001; B01D 39/08; B01D 39/14; B01D 39/18; B01D 46/0002;
(Continued)

(56) References Cited

U.S. PATENT DOCUMENTS

| | | | | |
|---|---|---|---|---|
| 5,306,321 A | * | 4/1994 | Osendorf | B01D 39/1623 210/493.1 |
| 5,554,025 A | * | 9/1996 | Kinsel | A61C 1/0076 210/321.64 |

(Continued)

FOREIGN PATENT DOCUMENTS

WO    WO-2018170114 A1 *    9/2018    ............. B01D 27/14

OTHER PUBLICATIONS

'413 WOISA, PCT/US2018/022413, Written Opinion of the International Searching Authority, dated May 14, 2018, 8 pages. (Year: 2018).*

*Primary Examiner* — Jonathan M Peo
(74) *Attorney, Agent, or Firm* — DeLio Peterson & Curcio LLC; Robert Curcio

(57) ABSTRACT

A combination gas and fluid filter housing for supporting said gas and fluid filter media, having a first subassembly for supporting the gas filter media, and a second subassembly for supporting the fluid filter media, the second subassembly having ingress and egress ports at an end opposite of the first subassembly attachable to a manifold, the first and second subassemblies removably attached to one another such that the first subassembly is removable from said second subassembly to facilitate gas filter media replacement without disconnecting the second subassembly ingress and egress ports from the manifold.

21 Claims, 5 Drawing Sheets

(51) Int. Cl.
   *B01D 39/08*   (2006.01)
   *B01D 39/14*   (2006.01)
   *B01D 39/18*   (2006.01)
   *B01D 46/00*   (2022.01)
   *B01D 46/24*   (2006.01)
   *B01D 46/52*   (2006.01)
   *F25D 17/04*   (2006.01)

(52) U.S. Cl.
   CPC ......... *B01D 39/18* (2013.01); *B01D 46/0002* (2013.01); *B01D 46/0008* (2013.01); *B01D 46/0038* (2013.01); *B01D 46/2411* (2013.01); *B01D 46/521* (2013.01); *F25D 17/042* (2013.01); *B01D 2279/65* (2013.01); *F25D 2317/0415* (2013.01)

(58) Field of Classification Search
   CPC ............ B01D 46/0008; B01D 46/0038; B01D 46/2411; B01D 46/521; B01D 2279/65; B01D 35/153; B01D 2201/0415; B01D 2201/302; B01D 2201/307; B01D 2265/04; B01D 2265/06; B01D 2271/022; B01D 2275/10; B01D 27/146; B01D 29/114; B01D 29/21; B01D 29/54; B01D 29/56; B01D 29/96; B01D 35/06; B01D 35/31; B01D 37/025; B01D 39/1623; B01D 46/0004; B01D 46/523; F25D 17/042; F25D 2317/0415; F25D 23/126; F25D 2317/041; F25D 2323/121; C02F 1/4691; C02F 2001/46133; C02F 2201/003; C02F 2201/004; C02F 2201/006; C02F 2303/04

See application file for complete search history.

(56) References Cited

U.S. PATENT DOCUMENTS 6,959,819 B2 *    11/2005  Moscaritolo ........... B01D 29/21
                                                    210/440
   7,335,240 B2 *    2/2008   Gunderson ........... F25D 17/042
                                                    55/315.1
   2008/0116125 A1 *  5/2008  Nero ................ C10M 175/0058
                                                    210/132
   2011/0303543 A1 * 12/2011  Fritze .................... B01D 35/06
                                                    204/554
   2012/0042677 A1 *  2/2012  Mitchell ............... F25D 23/126
                                                    62/318

* cited by examiner

COMBINATION FLUID AND GAS FILTER

BACKGROUND OF THE INVENTION

1. Field of the Invention

The present invention relates to a combination gas and fluid filter for use in environments where both gas and fluid filtration needs are required and space for mounting and placement is at a premium. Specifically, the invention relates to a combination air and water filter unit or module for enclosed structures, such as a refrigerator, where air quality and water quality are simultaneously, yet separately necessitated.

2. Description of Related Art

The prior art is replete with air filtration media within an air filter housing having open-air apertures for applications where air flow can be easily projected across the housing and through the filter.

The prior art is further replete with water filtration media in water filter housings having ingress ports to direct water flow through the filtration media, and egress ports to direct the filtered water away from the water filter housing.

Dual mounting of air and water filters in an environment where space is restricted poses a problem not yet addressed by the prior art. Furthermore, when one type of filter needs replacement, it is not necessarily timely for the other filter to be replaced. Thus, there is a need for separable air and water filters in a single housing module.

SUMMARY OF THE INVENTION

Bearing in mind the problems and deficiencies of the prior art, it is therefore an object of the present invention to provide a single housing capable of employing filter media for simultaneous, yet separate, air and water filtration.

It is another object of the present invention to provide a combination air and water filter housing where the filter media may be separated, and individually replaced.

A further object of the invention is to provide a combination housing for air and water filtration that provides compactness for enclosed structures where space is a premium.

The above and other objects, which will be apparent to those skilled in the art, are achieved in the present invention which is directed to a combination gas and fluid filter for an enclosed structure comprising: a gas filter media; a fluid filter media; and a housing for supporting the gas and fluid filter media, the housing including: a first subassembly for supporting the gas filter media; and a second subassembly for supporting the fluid filter media; the second subassembly including ingress and egress ports attachable to a manifold, the first and second subassemblies removably attached to one another such that the first subassembly is removable from the second subassembly to facilitate the gas filter media replacement without disconnecting the second subassembly ingress and egress ports from the manifold.

The gas is predominantly air, and the fluid is predominantly water.

The subassemblies may be injection molded, forming two distinct, attachable subassemblies.

The first subassembly includes apertures located through sidewalls for gas flow. The sidewalls are molded with the apertures, forming continuously connected sidewall segments.

The apertures may be different sizes and/or shapes, designed to accommodate specific air flow requirements and direction of the enclosed structure.

The gas filter media may further comprise an air filter media having pleated cylindrical fabric or paper, with pleats exposed to the outside elements by being proximate the apertures.

The gas filter media or the first subassembly or both are separable and removable from the second subassembly.

The gas filter media may be held in place by an endcap removably secured to a top portion of the first subassembly. The endcap may include an aperture located at or approximate an axial center of the housing.

The endcap may be designed with an annular space on a bottom side for enclosing and/or securing a top portion of the gas filter media.

The endcap is attached to the top portion of the first subassembly in a slip-fit, friction fit, screw fit, or molded compression fit, or may form a non-removable seal with the sidewalls of the first subassembly, and the first subassembly is removable from the second subassembly at the first subassembly's bottom end, such that the gas filter media is removable from the first subassembly's bottom end.

The second subassembly ingress and egress ports may be at an end opposite said first subassembly.

In a second aspect, the present invention is directed to a combination air and water filter for a refrigerator comprising: an air filter media; a water filter media; and a housing for supporting said air and water filter media, said housing including: a first subassembly for supporting said air filter media, and a second subassembly for supporting said water filter media, said second subassembly including ingress and egress ports attachable to a manifold, said first subassembly having a top end with a removable endcap for removably replacing said air filter media.

The second subassembly ingress and egress ports may be at an end opposite said first subassembly.

The endcap may include an annular groove for receiving said air filter media.

The housing may be a single, compartmentalized structure.

In a third aspect, the present invention is directed to a method of creating a combination air and water filter for a refrigerator system, comprising: providing a refrigerator system having a manifold for receiving a housing; providing an injection mold for forming the housing for supporting an air filter media and a water filter media, said housing including a first subassembly for supporting said air filter media, and a second subassembly for supporting said water filter media, said second subassembly including ingress and egress ports; and providing a removable endcap to be received by the first subassembly, the removable endcap which holds said air filter media within said first subassembly. The method includes the steps of creating the first subassembly and second subassembly of the housing using the injection mold; attaching the first subassembly to the second subassembly; inserting the air filter media into the first subassembly; inserting the removable endcap into the first subassembly to hold the air filter media within the first subassembly; inserting the water filter media into the second subassembly; and installing the housing into the refrigerator system by inserting the housing into the manifold.

The first subassembly may be attached to the second subassembly by being molded into a single piece.

The first subassembly may be attached to the second subassembly by friction fit, screw fit, molded compression fit, snap clipping, ultrasonic welding, or spin welding.

The manifold may receive the second subassembly ingress and egress ports, said manifold permitting water to flow into and out of the housing through the ingress and egress ports.

The injection mold may further comprise a first compartment for forming the first subassembly, and a second compartment for forming the second subassembly.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE EMBODIMENT(S)

In describing the embodiment(s) of the present invention, reference will be made herein to FIGS. 1-5E of the drawings in which like numerals refer to like features of the invention.

Figure 1:
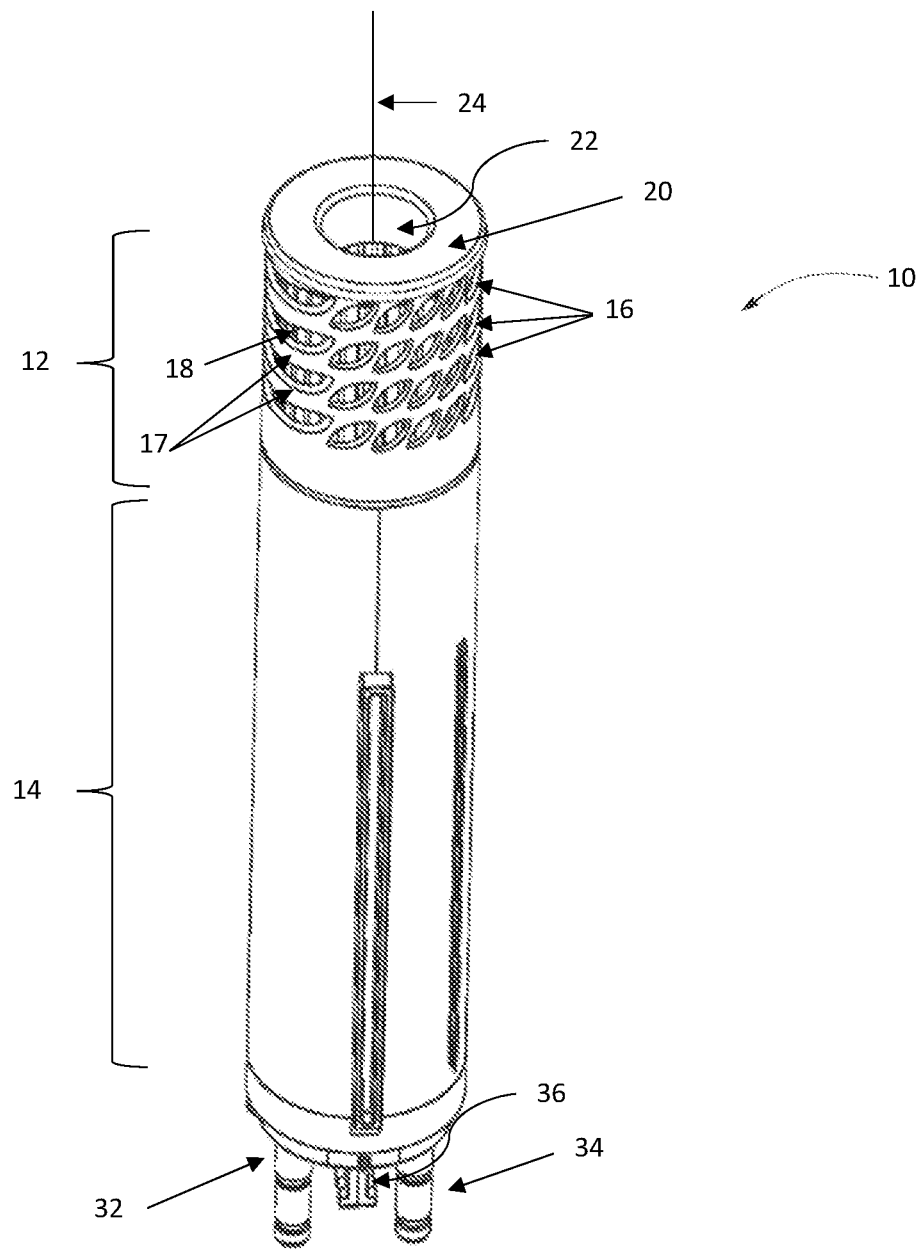
FIG. 1 is a top perspective view of a filter housing having a compartment or partition for gas filtration and a compartment or partition for fluid filtration, with attachment means to fluid ports of a fluid filter manifold.

A combination gas and fluid filter of the present invention is depicted in FIG. 1. FIG. 1 is a side perspective view of the combination filter housing 10 having a compartment or subassembly 12 for gas filtration and a compartment or subassembly 14 for fluid filtration, the latter having some form of attachment means to a filter manifold for receiving ingress and egress fluid ports 32, 34. The filter housing 10 may be configured as a single component or module, such as an injection molded component, that includes two distinct compartments 12, 14, or conversely it may be configured of two injection molded attachable subassemblies.

Compartment or subassembly 12 is adapted for gas filtration, and the predominant application is for filtering air. Clearly, other gases may be filtered depending upon the application, and the filter media in compartment or subassembly 12 is not limited solely to air filtration. In order to achieve air (gas) filtration, compartment or subassembly 12 is formed having apertures 16 located through the sidewalls. As depicted in FIG. 1, the sidewalls are molded with apertures such that sidewall segments 17 are interspersed to form the apertures. In filter housing 10, depicted in FIG. 1, a cylindrical shape is demonstrated where apertures 16 are shown in a piecewise continuous fashion circumferentially formed by sidewall segments 17. As depicted, apertures 16 may be different sizes and shapes, and can be designed to accommodate specific air flow requirements and direction. The goal being to expose the filter media in compartment 12 to the normal air flow of the enclosure.

For enclosed applications where air quality is of concern—such as within a refrigerator, a vehicle, a clean-air environment (such as that required in semiconductor fabrication chambers), or other enclosed structures—the aperture size, shape, and configuration (layout) will vary depending upon the amount of air filtration required, the air flow dynamics of the enclosed structure, and the placement or location of the air filter within the enclosed structure.

Enclosure air filters, such as refrigerator air filters, are key components for neutralizing odors. Air filter media may also be treated with deodorizers for enhanced odor protection. Air filters act to reduce particulate matter (microscopic particles suspended in the air) and gaseous pollutants. Air drawn through a filter can be substantially cleaned of viruses, many forms of bacteria, and other smaller particles.

Compartment or subassembly 14, as is further discussed below, is designed for fluid filtration, and predominantly for water filtration. Other fluids may be filtered by the filtration media in compartment or subassembly 14, and such filtration is application dependent. The invention is not limited to water filtration, and may be used in applications where other fluids (for example, oil based fluids), require filtration in addition to being in an environment where air filtration is also needed.

For exemplary purposes only, discussion will focus on the application of an air and water filter combination housing within a refrigerator, although other enclosed structures are easily applicable and the introduction of a combination filter housing is not intended to be limited to a specific enclosed structure.

Depicted in compartment or subassembly 12 is an air filter media 18. In the present example, air filter media 18 is a pleated cylindrical fabric or paper, with pleats exposed to the outside elements by virtue of being proximate to the apertures 16. Generally, the pleated filter paper is a continuous serpentine-like arrangement of planar filtering material, e.g., light filter paper having microporous pores. The serpentine-like arrangement consists generally of a multiplicity of reversely-bent folds or long pleats in fanfold or zig-zag manner, and typically arranged between the inflow or upstream side and/or the outflow or downstream side of the filtering apparatus. Such pleated filter papers may be fiberglass, polyester, high efficiency particulate arrestance ("HEPA"), and so on.

The air filter media housed within compartment or subassembly 12 is characterized by easy removal of the interior components for replacement purposes. Compartment or subassembly 12 is adapted to be secured in, and form a part of, an air flow passageway. The air filter media or the subassembly itself or both may be designed to be separable and removable from compartment or subassembly 14, which houses the fluid or water filter media, and ultimately replaceable. The air filter media may be a closed-cell foam cartridge adapted to be positioned within the housing, and may be in sealing engagement therewith, allowing the passage of air therethrough as air passes through the passageways or apertures. The air filter media may also be a reinforced non-woven filter media adapted to be positioned within the cartridge in a pleated fashion.

Other filter media types are not prohibited by this housing configuration. Air filtration media limitations are dependent upon the flow rate of air through the media, air pressure, and treatment characteristics needed for the contaminants desired for removal from the enclosed structure.

For example, the pleated filter media in compartment 12 may be comprised of fibrillated nanofibers or other thin, porous paper material, capable of allowing air flow therethrough without an appreciable drop in air pressure, which is especially advantageous in low air flow environments, such as refrigerator enclosures. Solid filter media, foam-based media, and other types of media may be employed provided the filter media lends itself to air flow applications. In some instances, filtration media may be used in a stagnant air flow environment where air flow is extremely limited. This filtration media is more adapted to slow, time-based filtration. The filtration media may also include added microbiological interception capabilities to remove contaminants from the air. Contaminant removal is application dependent, and more specifically concerns how the filtration media is treated for specific contaminants, such as for example, treatments of the filter media to remove a variety of contaminants such as chlorines, ammonia, ozone, particulate matter, sulfur dioxide, nitrogen dioxide, carbon monoxide, and lead, to name a few.

The air filter media 18 is shown held in place by an endcap 20, shown in FIG. 1 as a cylindrical endcap that may include an aperture, such as a circular aperture 22 at the housing's center axis 24, although the shape of the aperture is relative, and may be optimized for air flow rate and magnitude, for more air flow exposure to the filter media. In this manner, both the end of the filter housing 10 as well as the sidewalls of compartment or subassembly 12 allow for a configuration that promotes cross air flow, exposing the filtration media to air flow preferably in three degrees of freedom. Air flow entering circular aperture 22 may exit apertures 16 formed by sidewall segments 17, or vice versa. The endcap 20 includes at least an inner flange and that defines an annular space adapted to receive a filter media, and preferably a pleated paper or non-woven fabric filter media. The pleated filter media 18 may be potted within the annular space to form a tight seal that is not prone to leakage, or may simply be held in the annular space by compression or friction fit, or loosely held in the annular space for easy removal.

Figure 2:
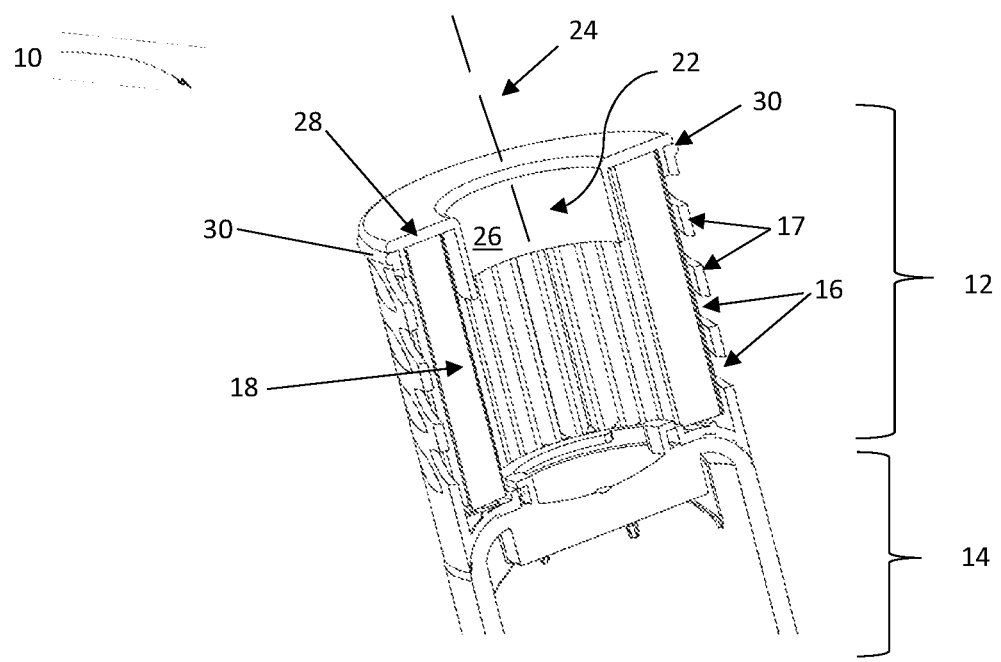
FIG. 2 is a cross-sectional view of the gas filter portion of the filter housing of FIG. 1.
Figure 3B:
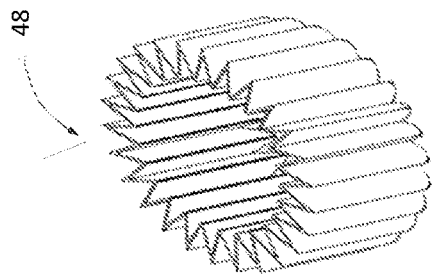
FIG. 3B depicts a cross-sectional view of the gas filter portion of the housing of FIG. 3A.
Figure 3E:
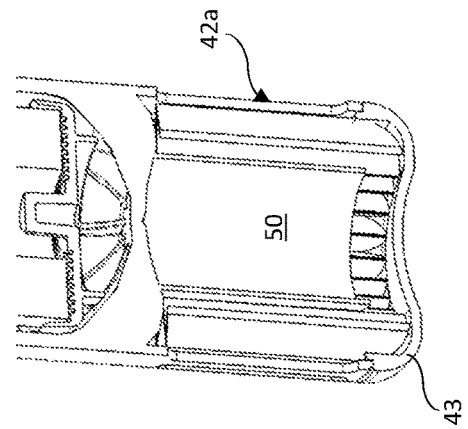
FIG. 3E depicts the gas filter for insertion within the gas filter portion of the housing of FIG. 3A.
Figure 3A:
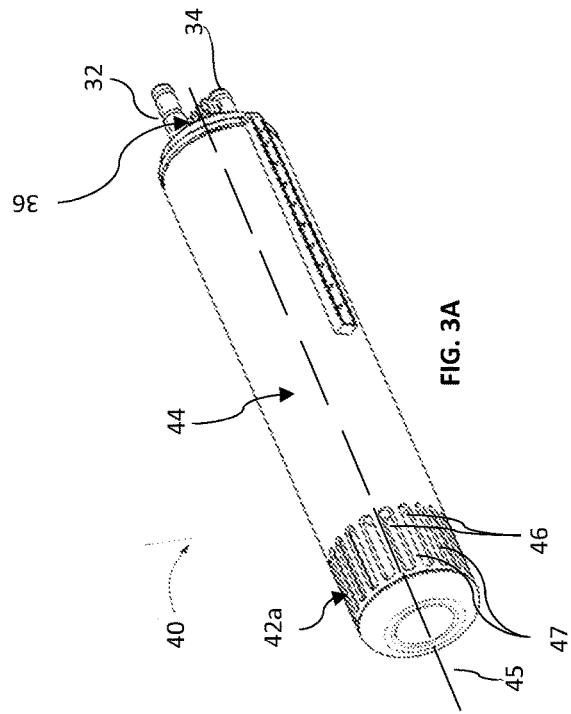
FIG. 3A depicts a perspective view of the combination gas/fluid filter housing of the present invention.
Figure 3D:
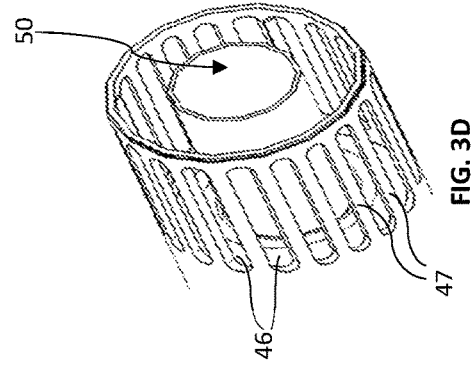
FIG. 3D depicts the gas ports or apertures of the gas filter portion of the housing of FIG. 3A.
Figure 3C:
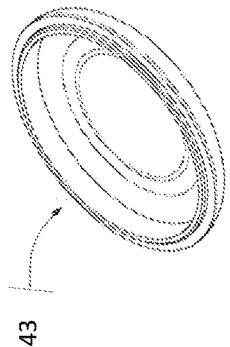
FIG. 3C depicts an end cap of the gas filter portion of the housing of FIG. 3A.
Figure 4B:
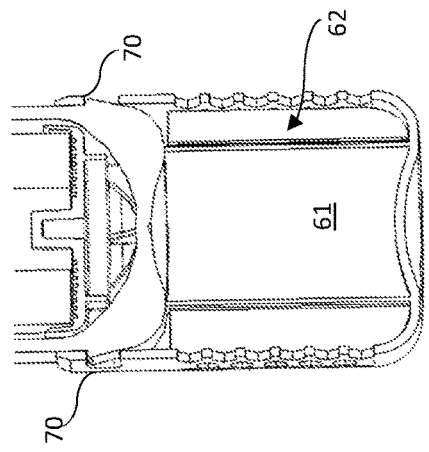
FIG. 4B depicts a cross-sectional view of the gas filter portion of the filter housing of FIG. 4A.
Figure 4E:
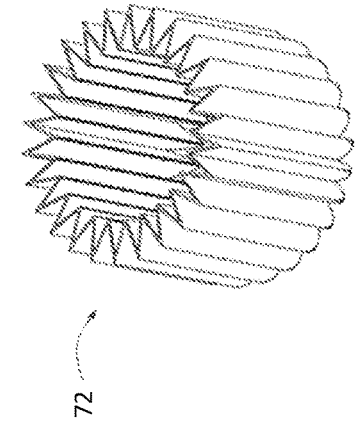
FIG. 4E depicts the gas filter for insertion within the gas filter portion of the housing of FIG. 4A.
Figure 4A:
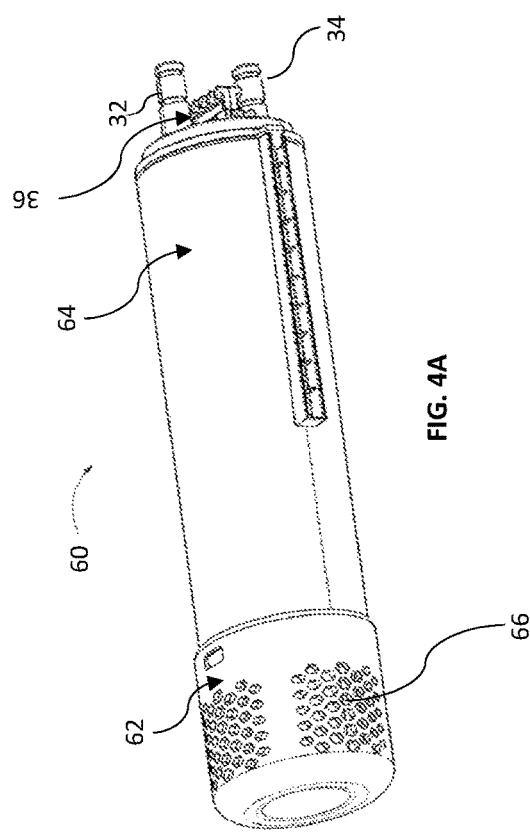
FIG. 4A depicts an embodiment of the filter housing of the present invention with the compartment for gas filtration being a separate piece from the compartment for fluid filtration, the compartment for gas filtration being connectable to the housing with a snap clip.
Figure 4D:
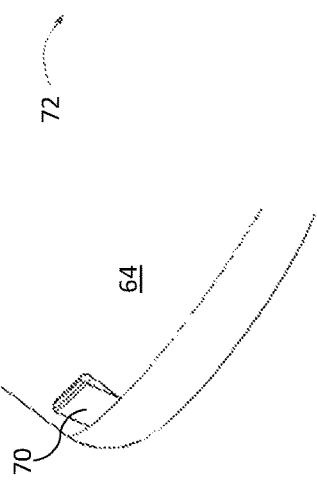
FIG. 4D depicts the housing end portion of the fluid filter housing section with resilient protrusions for attachment to the gas filter end cap.
Figure 4C:
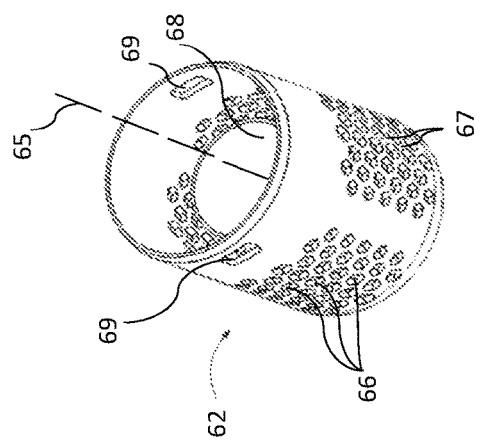
FIG. 4C depicts the perforated gas filter end cap of the filter housing of FIG. 4A.
Figure 5A:
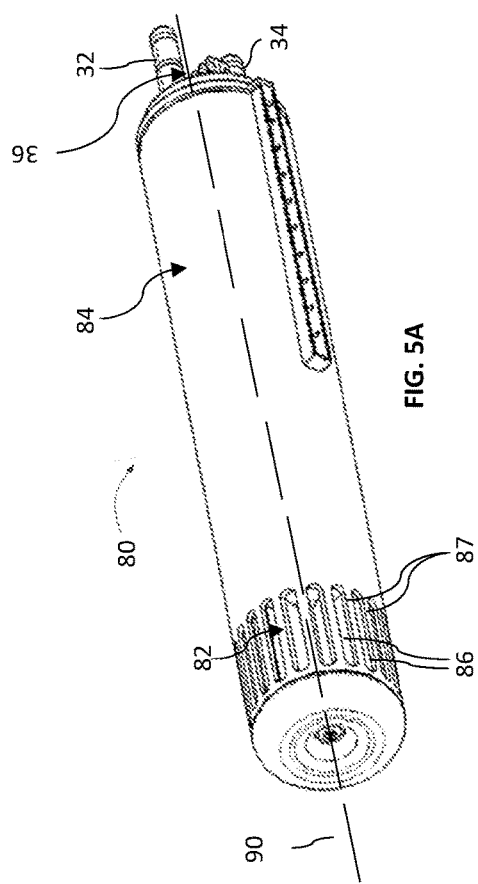
FIG. 5A is an embodiment of the filter housing of the present invention with the compartment for gas filtration having an end cap connectable to said compartment via a screw.
Figure 5B:
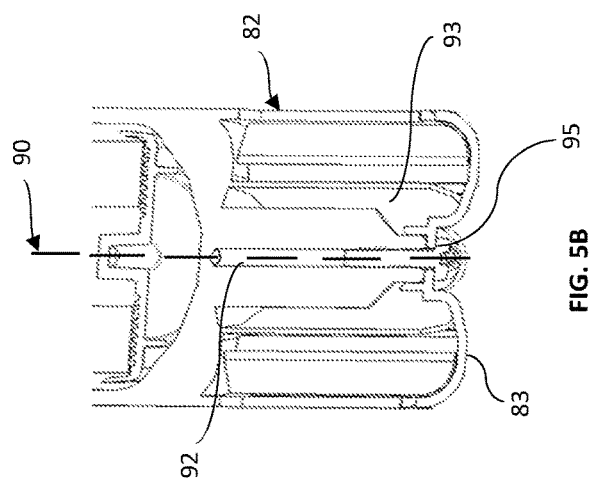
FIG. 5B depicts a cross-sectional view of the gas filter portion of the filter housing of FIG. 5A.
Figure 5E:
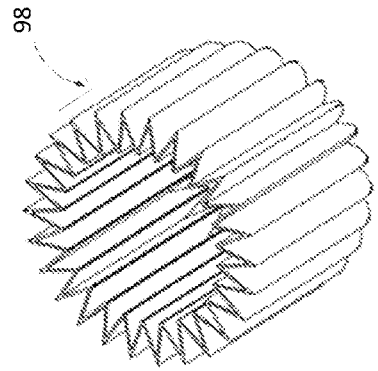
FIG. 5E depicts the gas filter for insertion within the gas filter portion of the housing of FIG. 5A.
Figure 5D:
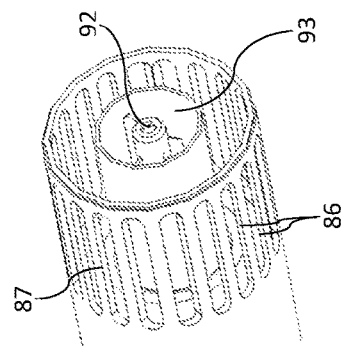
FIG. 5D depicts the housing end portion of the fluid filter housing section with a center aperture for screw attachment to the housing gas filter end cap.
Figure 5C:
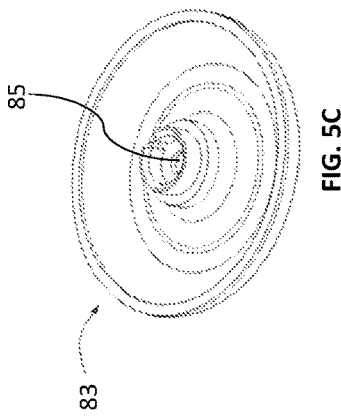
FIG. 5C depicts the gas filter end cap of the filter housing of FIG. 5A.

FIG. 2 depicts a partial, cross-sectional view of filter housing 10 of FIG. 1. As depicted in FIG. 2, circular aperture 22 is shown extending partially within compartment 12 forming an inner circumferential sidewall 26 about center axis 24. Circumferential sidewall 26, the bottom side of the endcap, and outer endcap sidewalls 30 form annular space 28 for securing the top portion of air filter media 18 in place. Endcap 20 is attached to the top portion of compartment or subassembly 12, typically in a slip-fit, a friction fit, a screw fit, or a molded compression fit, or the like. In one embodiment, endcap 20 forms a non-removable seal with the sidewalls of compartment or subassembly 12, such that subassembly 12 is removable from subassembly 14 at subassembly 12's bottom end, that is, the end opposite endcap 20, and filter media 18 may be removed from that bottom end, rather than at subassembly 12's top end. In another embodiment, independent whether compartment or subassembly 12 is removable from compartment or subassembly 14, endcap 20 may be removably secured to allow a user to remove filter media 18 from the top portion of filter housing 10.

The bottom portion of compartment or subassembly 12 is attached to the top portion of compartment or subassembly 14; however, gas and/or fluid are not exchanged between compartments, and the air filter media 18 does not receive fluid directly or indirectly from the ingress ports 32, 34 of filter housing 10.

Attachment schemes for the two subassemblies 12, 14 are varied, and may, for example, be dictated by injection molded capabilities and limitations. In the exemplary embodiment depicted in FIG. 2, the bottom portion of compartment 12 is formed to accommodate the curvature of the top portion of compartment 14; however, such accommodation is not necessary to the present invention, and a gap may be present between the two compartments without degradation of housing assembly or filtration quality. The closer the two compartments are situated to one another, the more compact the filter housing can be, and thus, provide for significant filtration in a smaller (shorter), compact housing.

The two compartments or subassemblies 12, 14 may be molded in a single piece construction, formed separately and attached together by friction fit, a screw fit, a molded compression fit, snap clipping, ultrasonic welding, spin welding, or other such attachment schemes known in the art.

Generally, enclosure air filters are flat, rectangular structures situated at the wall of the enclosure to filter incoming air from outside the enclosure. In the present invention, the combination gas/fluid filter is designed for placement inside an enclosure, such as a refrigerator, where the air filter is responsive to low pressure air circulation within the enclosure, while being in close proximity to a water inlet line for simultaneous water filtration from a water filter in the same housing as the air filter.

Compartment or subassembly 14 is a fluid filtration housing component. It includes a fluid filtration media (not shown), which for water is most likely an extruded carbon block, loose granular media, pleated paper or non-woven fabric media, or some combination thereof; however, the present invention is not limited to any particular type of fluid filtration media. For example, the filter media may include microbiological interception capability, or be designed for removal of specific contaminants, such as chlorine, lead, arsenic, and the like. For the exemplary embodiment of a combination air and water filter housing for a refrigerator application, the filter media of compartment or subassembly 14 is designed to filter fluid piped into the refrigerator, and directed to the ingress port 32 of housing 10, with the expectation that the water is to be used for human consumption.

Compartment or subassembly 14 has a sealed top end where it meets with compartment or subassembly 12, such that fluid and gas are not exchanged between the two compartments or subassemblies. The bottom end of compartment or subassembly 14 includes two ports, one for ingress 32 and the other for egress 34, and typically some form of connection scheme/subassembly connector 36 for attachment to a manifold. Water filtration is performed in compartment or subassembly 14 in a manner typical of refrigerator water filters.

FIGS. 3A-3E depict an alternate embodiment showing filter housing 40. Subassembly 44 designed for water filtration media remains the same as described above. Subassembly 42a represents that portion of filter housing 40 that encompasses the air filter. Subassembly 42a is comprised of apertures 46 parallel both to each other and to axis 45, the apertures spanning the periphery of subassembly 42a. Sidewall segments 47 are disposed between each aperture 46, the sidewall segments 47 may also run parallel with apertures 46 and central axis 45, although such directional configuration need not be so limiting. Endcap 43 is shown as a shallow, solid disk attachable to the bottom edge of subassembly 42a by ultrasonic welding or spin welding. Filter media 48 is inserted into subassembly 42a prior to the welding of endcap 43, the filter media 48 surrounding cylindrical support 50, which for this alternative embodiment is affixed within subassembly 42a instead of on endcap 43 as previously described.

FIGS. 4A-4E depicts another embodiment of the filter, showing filter housing 60. Subassembly 62 represents that portion of filter housing 60 that encompasses the air filter designed for gas filtration. Subassembly 64 represents the filter housing portion responsible for water filtration. Subassembly 62 is comprised of circular apertures 66 disposed about the periphery of subassembly 62, shown in a honeycomb pattern, with sidewall segments 67 interposed between the apertures. Subassembly 62 may simultaneously serve as endcap 68, connectable to subassembly 64, for example via a snap clip. Endcap 68 is shown here as a separate component having apertures 69 for receiving snap clips or extended protrusions 70 on filter housing subassembly 64 shown in FIG. 4D. Snap clips or extended protrusions 70 are connectable to the bottom edge of subassembly 62 at apertures 69. Cylindrical support 61 may either be affixed within subassembly 62 when subassembly 62 serves the dual purpose of an endcap, or it may be affixed on an endcap spanning around the endcap's central axis when endcap serves as a separate piece connectable to subassembly 62. Filter media 72 is inserted into subassembly 62 and surrounds cylindrical support 61 prior to connecting subassembly 62 to subassembly 64 with the snap clips or extended protrusions 70.

FIGS. 5A-5E show yet another embodiment of the housing 80. Subassembly 84 is designed for water filtration. Subassembly 82 is designed for air filtration, and is comprised of apertures 86 parallel to each other and to central axis 90, the apertures 86 spanning the periphery of subassembly 82. Endcap 83 is depicted as a disk with a concave center having a center hole 85 sharing the central axis 90 with the endcap 83 and filter housing 80 (after installation). This center hole 85 is designed to receive a screw 95 which would extend through endcap 83 and is threadably attachable with bore 92 extending through circular aperture 93 disposed within subassembly 82, shown as being integral with filter housing 80. Filter media 98 is inserted into subassembly 82 and surrounds circular aperture 93. Endcap 83 is then placed over subassembly 82 so that the perimeter edge of endcap 83 lines up with the perimeter edge of subassembly 82. The screw 95 is then threadingly received in endcap 83 center hole 85 and the bore 92 of cylindrical support 93 to hold endcap 83 in place, the screw 95 inserted in the direction of central axis 90.

By adding an, air filter to a refrigerator water filter in a single housing enclosure, the compact design is advantageous to the refrigerator topology not before realized or implemented in the art. For combination filter configurations where it is preferred to replace the air filter before a water filter needs to be replaced, the endcap of the filter housing compartment or subassembly is designed to be removably attached, or the subassembly itself is designed to be removably attached. In the former configuration, the filter media may be removed from the top portion of compartment or subassembly simply upon removal of endcap, or in the latter configuration, the filter media may be removed from the bottom portion of the subassembly when air filter subassembly is removed from the water filter subassembly. In either configuration, a user may replace the air filter without disconnecting the water filter compartment or subassembly 14 from the manifold.

The aforementioned design allows for the replacement of one filter media instead of two simultaneously, even though both filter media are enclosed in one housing. Further, the design improves the frequency of replacement.

Alternatively, the filters may be sealed in the housing, and both filters replaced simultaneously when the housing is removed and replaced.

A further benefit of the combined air and water filter housing design is the advantage it gives a manufacturer to design for air flow through a fully apertured housing, which maximizes the contact time with the air filtration media, while allowing for a single compact footprint for placement of both air and water filters within the enclosure.

In other embodiments, sensors and/or filter monitoring devices, such as fluid flow sensors, microbiological sensors, conductivity sensors, time-duration sensors, and other such parameter measuring, sensing, and/or controls, may be employed to facilitate the quality of the filtering apparatus for both fluid and gas considerations.

While the present invention has been particularly described, in conjunction with a specific preferred embodiment, it is evident that many alternatives, modifications and variations will be apparent to those skilled in the art considering the foregoing description. It is therefore contemplated that the appended claims will embrace any such alternatives, modifications and variations as falling within the true scope and spirit of the present invention.

Thus, having described the invention, what is claimed is:

1. A combination gas and fluid filter cartridge for an enclosed structure comprising:
   a housing containing a central longitudinal axis, a gas filter media and a liquid filter media said housing including:
   a first subassembly enclosing said gas filter media and including apertures spanning a periphery of a radially disposed sidewall of the first subassembly, wherein said apertures are disposed parallel to the central longitudinal axis and wherein said apertures allow gas flow to said gas filter media; and
   a second subassembly attached to said first subassembly at a first subassembly end enclosing said liquid filter media;
   said second subassembly including a second subassembly end comprising an ingress port, and egress port, and a second subassembly connector, said second subassembly end attachable to a filter manifold to establish fluid communication between the filter manifold and the filter housing, said first and second subassemblies removably attached to one another such that said first subassembly is removable from said second subassembly to facilitate replacement of said gas filter media without disconnecting said ingress and egress port of said second subassembly from said filter manifold, and wherein said housing is removably attachable to said filter manifold, such that said first subassembly and said second subassembly is secured to a refrigerator by said second subassembly connector.

2. The combination gas and fluid filter cartridge of claim 1 wherein said gas filter media is an air filter media, and said liquid filter media is a water filter media.

3. The combination gas and fluid filter cartridge of claim 2 wherein said first and second subassemblies are injection molded, forming two distinct, attachable subassemblies.

4. The combination gas and fluid filter cartridge of claim 1 wherein said radially disposed sidewall is molded with said apertures, forming continuously connected sidewall segments.

5. The combination gas and fluid filter cartridge of claim 1 wherein said apertures are different sizes and/or shapes, designed to accommodate predetermined air flow direction within said enclosed structure.

6. The combination gas and fluid filter cartridge of claim 2, wherein said gas filter media comprises said air filter media having pleated cylindrical fabric or paper with pleats exposed to outside elements by being proximate said apertures.

7. The combination gas and fluid filter cartridge of claim 1 wherein said first subassembly is secured in and/or forms a part of an air flow passageway of said enclosed structure.

8. The combination gas and fluid filter cartridge of claim 1 wherein said gas filter media is held in place by an endcap removably secured to a top portion of said first subassembly.

9. The combination gas and fluid filter cartridge of claim 1 wherein the first subassembly includes an inner cylindrical shell for receiving said gas filter media.

10. The combination gas and fluid filter cartridge of claim 8 wherein said endcap includes an aperture located at or approximate an axial center of said housing.

11. The combination gas and fluid filter cartridge of claim 8 wherein said endcap includes an annular space on a bottom side for enclosing and/or securing a top portion of said gas filter media.

12. The combination gas and fluid filter cartridge of claim 8 wherein said endcap is attached to said top portion of said first subassembly in a slip-fit, friction fit, screw fit, or molded compression fit.

13. The combination gas and fluid filter cartridge of claim 8 wherein said endcap forms a non-removable seal with the radially disposed sidewall of said first subassembly.

14. A combination air and water filter cartridge for a refrigerator comprising:
an air filter media;
a water filter media; and
a housing enclosing said air and water filter media, said housing including:
a central longitudinal axis;
a first subassembly enclosing said air filter media, said first subassembly forming a cavity having an open end for receiving said air filter media, said open end of said first subassembly attachable to an endcap for securing said air filter media within said first subassembly or attachable to a second subassembly such that upon attachment said air filter media is secured within said first subassembly, said first subassembly including apertures spanning a periphery of a radially disposed sidewall of the first subassembly, wherein said apertures are disposed parallel to the central longitudinal axis and wherein said apertures allow gas flow to said air filter media; and
said second subassembly enclosing said water filter media and having a second subassembly connector for connecting to a filter manifold on said refrigerator to establish fluid communication between the filter manifold and the housing, said second subassembly including an end opposite said first subassembly comprising ingress and egress ports insertable within said filter manifold, such that said housing is removably attachable to said filter manifold and said first subassembly and said second subassembly is secured to said refrigerator by said second subassembly connector.

15. The combination air and water filter cartridge of claim 14 wherein said endcap includes an annular groove for receiving said air filter media.

16. The combination air and water filter cartridge of claim 14 wherein said first subassembly includes a cylindrical support axially centered about said first subassembly to receive said air filter media.

17. The combination air and water filter cartridge of claim 14 wherein said housing is a single, compartmentalized structure, and said open end of said first subassembly faces away from said second subassembly, said open end sealed by said endcap.

18. A method of creating a combination air and water filter for a refrigerator system, comprising:
providing the refrigerator system having a filter manifold for receiving a filter housing;
providing said filter housing for supporting an air filter media and a water filter media, said filter housing including a central longitudinal axis, a first subassembly for supporting said air filter media, and a second subassembly for supporting said water filter media, said first subassembly including apertures spanning a periphery of a radially disposed sidewall of the first subassembly, wherein said apertures are disposed parallel to the central longitudinal axis and wherein said apertures allow gas flow to said air filter media, said second subassembly including ingress and egress ports and a connector for attachment to said filter manifold for permitting water to flow into and out of the filter housing through the ingress and egress ports;
providing a removable endcap to be received by the first subassembly, the removable cap which holds said air filter media within said first subassembly;
attaching the first subassembly to the second subassembly;
inserting the air filter media into the first subassembly;
attaching the removable endcap to the first subassembly to hold the air filter media within the first subassembly;
inserting the water filter media into the second subassembly;
installing the filter housing into the refrigerator system by inserting the second subassembly ingress port, egress port, and said connector into the filter manifold; and
securing said first subassembly and said second subassembly to said filter manifold of the refrigerator system.

19. The method of claim 18 wherein the first subassembly is integral with the second subassembly.

20. The method of claim 18 wherein the first subassembly is attached to the second subassembly by friction fit, screw fit, molded compression fit, snap clipping, ultrasonic welding, or spin welding.

21. The method of claim 18 wherein providing an injection mold further comprises a first compartment for forming the first subassembly, and a second compartment for forming the second subassembly.

\* \* \* \* \*